United States Patent
Forster et al.

(10) Patent No.: US 6,628,237 B1
(45) Date of Patent: Sep. 30, 2003

(54) REMOTE COMMUNICATION USING SLOT ANTENNA

(75) Inventors: Ian J. Forster, Essex (GB); Peter Robert George Horrell, Essex (GB)

(73) Assignee: Marconi Communications Inc., Warrendale, PA (US)

( * ) Notice: Subject to any disclaimer, the term of this patent is extended or adjusted under 35 U.S.C. 154(b) by 0 days.

(21) Appl. No.: 09/536,334

(22) Filed: Mar. 25, 2000

(51) Int. Cl.[7] .............................................. H01Q 13/10
(52) U.S. Cl. ..................... 343/767; 343/746; 340/572.7
(58) Field of Search ................................. 343/767, 768, 343/746; 340/572.7, 572.1, 572.4, 572.8; 399/24, 12, 13

(56) References Cited

U.S. PATENT DOCUMENTS

| | | | |
|---|---|---|---|
| 3,961,323 A | 6/1976 | Hartkorn | 340/280 |
| 4,051,480 A | 9/1977 | Reggia et al. | 343/705 |
| 4,086,598 A | 4/1978 | Bogner | 343/768 |
| 5,255,819 A | 10/1993 | Peckels | 222/1 |
| 5,461,393 A | 10/1995 | Gordon | 343/769 |
| 5,495,218 A | 2/1996 | Erb et al. | 333/248 |
| 5,507,411 A | 4/1996 | Peckels | 222/1 |
| 5,621,419 A | 4/1997 | Meek et al. | 343/770 |
| 5,691,731 A | 11/1997 | van Erven | 343/742 |
| 5,774,876 A | 6/1998 | Woolley et al. | 705/28 |
| 5,864,323 A | 1/1999 | Berthon | 343/788 |
| 5,914,640 A | 6/1999 | Nasserbakht | 330/294 |
| 5,929,813 A | 7/1999 | Eggleston | 343/700 |
| 6,018,299 A | 1/2000 | Eberhardt | 340/572.7 |
| 6,023,244 A | 2/2000 | Snygg et al. | 343/700 |
| 6,385,407 B1 * | 5/2002 | Inose | 399/24 |

FOREIGN PATENT DOCUMENTS

| | | | |
|---|---|---|---|
| DE | 44 46 2-3 A | 6/1996 | |
| WO | WO 99 65002 A | 12/1999 | G08B/13/14 |

* cited by examiner

*Primary Examiner*—Hoang Nguyen
(74) *Attorney, Agent, or Firm*—Withrow & Terranova PLLC

(57) ABSTRACT

A wireless communication device and method for identifying a container or communication information about a container using a slot in the container as an antenna. The device includes a wireless communication device for transmitting information regarding the container. The container includes an outer wall forming rim and a slot between the rim edge and the outer wall that is circular and continues without boundaries. The wireless communication device is coupled to the slot to provide the slot antenna for communications. An impedance matching network is additionally provided to make the operating frequency of the slot the same as the operating frequency of the wireless communication device. Alternatively, shorting posts may placed in the slot to define boundaries of the slot to match the operating frequency of the slot to the operating frequency of the antenna.

44 Claims, 14 Drawing Sheets

REMOTE COMMUNICATION USING SLOT ANTENNA

FIELD OF THE INVENTION

The present invention relates generally to a device and method for identifying a container and, more particularly, to a device and method using the slot of the container as an antenna for remote communications.

BACKGROUND OF THE INVENTION

It is often necessary to monitor the location and movement of materials within a distribution center or manufacturing facility. One method of tracking the materials is to attach a wireless communication device such as a radio frequency identification (RFID) transponder or other identification device to containers that are housing the materials. By way of example, a liquid container such as a barrel or keg may include an identification device indicative of the liquid contained inside. An interrogation reader, or series of receivers, having an antenna device and able to send information remotely through electronic signals, is placed throughout the distribution or manufacturing facility to receive signals transmitted from the identification devices. The signals are then passed to a central control system that monitors and records the applicable information. The central control system can also send information to its interrogation readers to send to the transponders for response and/or to be stored in the transponder's memory.

The information communicated by the containers in the system to the interrogation readers may be used for a number of reasons. For example, a statistical analysis may be made of the materials to maintain an accurate inventory, production flow rates, and other production standards. Additionally, the identification devices may include specific information about the materials housed within the containers including date of manufacture, place of manufacture, type of product within the container, temperature of the container and ambient air, temperature of the contents of the container, and pressure of the container, etc. The wireless communication device must have some type of antenna arrangement to communicate information about the containers to the interrogation readers. It is generally known for wireless communication devices to include an antenna. It is often a problem for many wireless communication devices to provide antenna especially if the wireless communication device is small or is required to be placed in a contained area. The length of the antenna must be tailored to the specific frequency that the wireless communication device is designed to operate. For low frequencies in the megahertz range or lower, an antenna may have to be several inches long to several feet long. Even for higher frequencies, the antenna may have to be several inches long to allow successful communication at the desired operating frequency.

Additionally, the antenna must either be packaged inside the wireless communication packaging or located external to the wireless communication device. External positioning of the antenna to the wireless communication device provides several other challenges when placing the wireless communication device in confined areas such as a container. The antenna may have additional problems radiating energy effectively if the antenna is contained internal to a device such as a container.

One example of a container that one may wish to attach a wireless communication device to is a beer keg. A beer keg has a substantially cylindrical shape with a smooth, uniform outer wall. There are no extensions or areas for effectively attaching the wireless communication device. Even if the wireless communication device can be attached to the keg, additional problems in packaging and unaltered communication exists in including an antenna for the wireless communication device as described above.

Some containers have a slot as a characteristic of their manufacture. For example, a beer keg is made out of a metal material that has an outer wall with a curled end to form a rim. The keg rim is used for handling and movement of the keg. The curled portion of the rim bends inward towards the outer wall leaving a small gap between the edge of the rim and outer wall. This small gap forms a slot that extends circularly around the keg and can be used to provide a slot antenna for the wireless communication device. The wireless communication device can be designed to provide electronic connectivity to the slot when installed so that the slot can be used to provide the effect of an antenna. Since the slot of the container may be several feet long, using the slot for the antenna may be advantageous for communication at lower frequencies where providing an antenna of sufficient length for communication at the desired frequency is problematic.

Therefore, it is advantageous to use the slot of a container to provide an effective antenna for a wireless communication device.

SUMMARY OF THE INVENTION

The present invention includes a wireless communication device using a slot antenna arrangement formed by the slot of a container. A wireless communication device is provided with the container to provide information about the identification or other aspect of the container as it moves through manufacturing, tracking or shipping facilities.

An antenna is provided for the wireless communication device so that it can communicate remotely with a transmitter/receiver sometimes called an interrogation reader. The present invention capitalizes on the phenomenon that exists whereby a slot cut out of a conductive material such as metal can be coupled to a wireless communication device's communications electronics to provide the effect of a pole antenna.

Some containers have by the nature of their construction a slot that can be used to provide a slot antenna. Alternatively, a slot can also be cut out of the container as well. Using a slot antenna instead of a pole antenna provides several advantages. The length of the slot for the wireless communication device to operate at the desired frequency may be more suitable than could be provided by using a pole antenna. Additionally, the slot does not require that a pole device be placed inside or proximate to the container. This is especially true for lower frequency communications that require longer length antennas. Using the slot may also be less expensive than using a pole antenna. Additionally, a pole antenna may extend from the container that may expose it to damage.

In one embodiment, the wireless communication device uses feed lines directly connected to the each edge of the slot.

In another embodiment, the wireless communication device includes feed lines that reactively couple with each edge of the slot.

In another embodiment, a conductive device is placed between the slot to couple the wireless communication device to the slot and provide the slot antenna.

In yet another embodiment, the wireless communication device is mounted on a non-conductive substrate in the slot.

A feed line from the wireless communication device rests on the substrate such that it reactively couples with the slot to provide the slot antenna.

A technique is provided to ensure that the operating frequency of the slot matches the operating frequency of the wireless communication device to maximize the slot antenna radiation efficiency. A circuit is provided in between the slot and the wireless communication device to match the impedance of the slot to the impedance of the wireless communication device.

In an alternative embodiment, shorting posts are provided on the ends of the slot to create a slot with the desired length. The shorting posts are constructed out of a conductive material and are placed between the slot's edges to short both sides of the slot together.

The invention also includes a method of monitoring the container. While the container is within a facility, such as during manufacturing, filling, or storing, the container is moved through at least one interrogation point containing an interrogation reader. Communication between the wireless communication device and the interrogation reader is established for monitoring the location and/or content information about the container. A central control system may be in communication with the interrogation point for monitoring the movement of the container. The central control system may monitor the position of the container, or it may also monitor specific information that is stored within memory in the device.

DETAILED DESCRIPTION OF THE INVENTION

Figure 1:
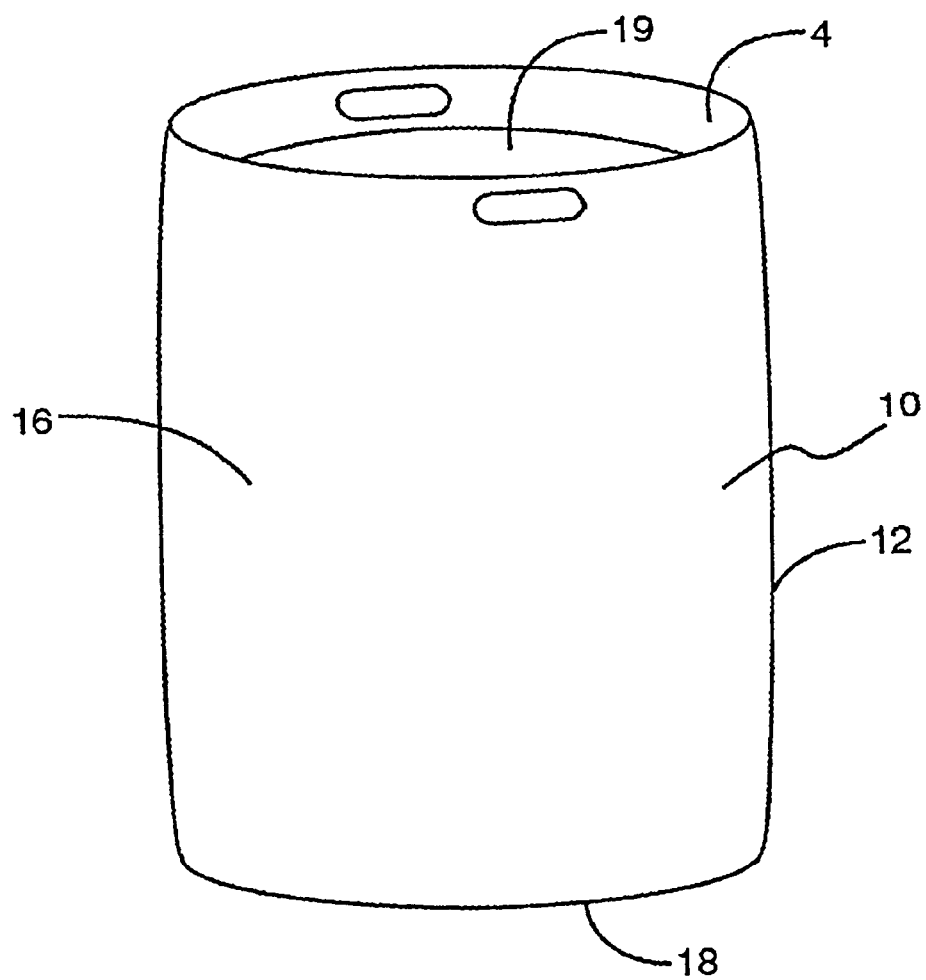
FIG. 1 is a perspective view of a container constructed in accordance with the present invention.
Figure 2:
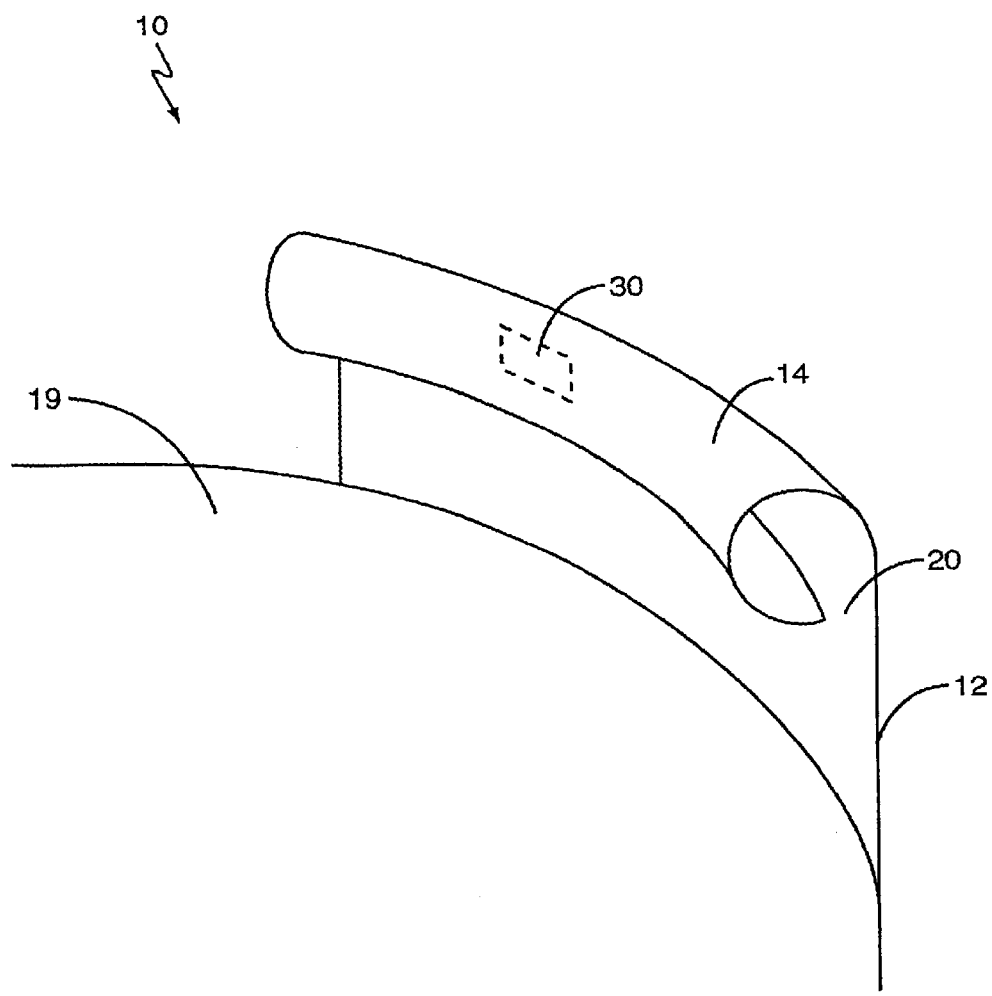
FIG. 2 is a cross sectional side view of the slot in the container.

The present invention is directed to a device and method of using a slot in a container as an antenna for a wireless communication device. As illustrated in FIGS. 1 and 2, the invention includes a wireless identification device 30, called a "transponder," that is mounted in a container 10 for identifying the container 10. The container 10 has outer walls 12, including a bottom wall 18, a top wall 19, and outer walls 12 sealed together forming an enclosed chamber for housing a material 16. A rim 14 is formed by the outer wall 12 and may extend above the top wall 19 and the bottom wall 18, for handling the container 10. The outer wall 12 extends upward and curls inward to form the rim 14. The gap between the end of the curled outer wall and the outer wall 12 is called the slot 20 that extends around the circumference of the container 10. A transponder 30 is provided within the rim 14 and preferably contains information about the container 10 that is communicated to at least one interrogation reader.

Figure 3:
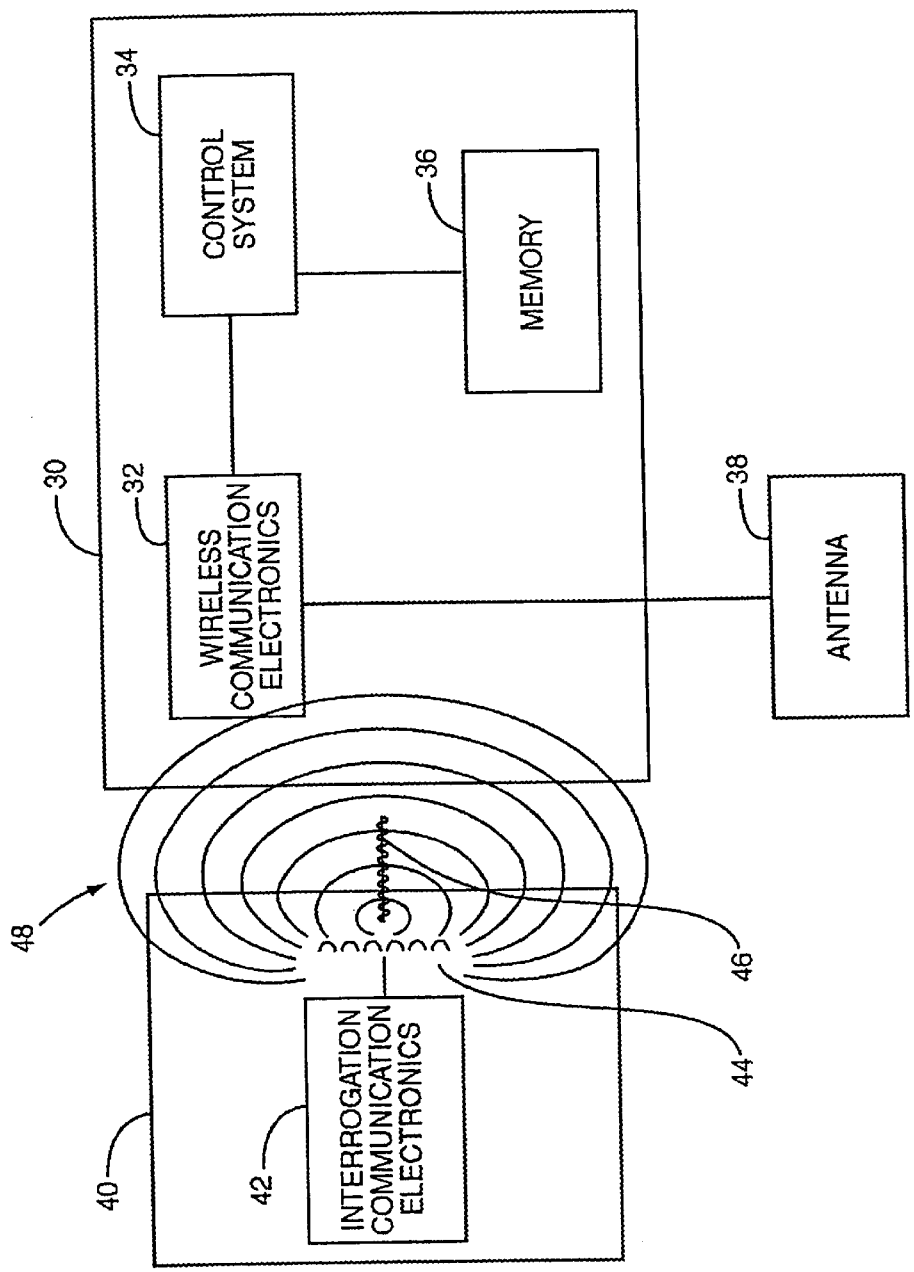
FIG. 3 is a schematic diagram illustrating communication between the transponder and an interrogation reader.

FIG. 3 illustrates one particular type of wireless communication device 30 called a radio frequency transponder 30. The present invention is described as using a transponder 30 as the wireless communication device as these terms are interchangeable. It should be readily understood to one of ordinary skill in the art that there are many other different types of wireless communication devices that allow electronic communication and therefore the present invention is not limited to any one particular type.

The transponder 30 includes a control system 34 and wireless communication electronics 32. The transponder 30 may also contain local memory 36 for storage of information to be communicated to an interrogation reader. Alternatively, the transponder 30 may store information such as an identification number or indicia by using diodes, -dip switch or some other like circuitry, and is not limited to transponders 30 that contain memory 36. An antenna 38 is also provided for communication that may be either external to or incorporated internal to the transponder 30. The particular type and location of the antenna 38 will depend on the operating frequency of the transponder 30 and the particular design desired.

The control system 34 is an integrated circuit or other type of microprocessor or micro-controller electronics that controls the substantive operations of the transponder 30. The control system 34 is connected to the wireless communication electronics 32 to communicate and receive transmissions. The control system 34 is also connected to memory 36 for storing and retrieving information. Control system 34 may further include a clock.

FIG. 3 also depicts how communication is achieved with the transponder 30. An interrogation reader 40 contains interrogation communication electronics 42 and an interrogation antenna 44. The interrogation reader 40 communicates to the transponder 30 by emitting an electronic signal or command 46 modulated in a frequency through the interrogation antenna 44. The interrogation antenna 44 may be any type of antenna that can radiate the modulated signal 46 through a field 48 so that a compatible device such as the transponder 30 can receive such signal 46 through its own antenna 38. The field 48 could be any of a variety of different types used in electronic communications including electromagnetic, magnetic, or electric. The signal 46 is a message containing information and/or specific instructions for the transponder 30.

When the transponder antenna 38 is in the presence of the field 48 emitted by the interrogation reader antenna 44, the wireless communication electronics 32 are energized thereby energizing the transponder 30. The transponder 30 remains energized so long as its antenna 38 is in the field 48 of the interrogation reader 40. The wireless communication electronics 32 demodulate the signal 46 and send the message containing information and/or specific instructions to the control system 34 for appropriate actions. For example, the request in the message may be for the transponder 30 to send back its identification information about the container 10 or the materials 16 housed within the container 10 including date of manufacture, place of manufacture, and type of product within the container. The message may also be instructions to send back information regarding the temperature of the container, pressure levels, etc. For whatever type of information requested, the transponder 30 communicates back the information requested to the interrogation reader 40 by altering the contents of the signal 46.

Alternative forms exist for communicating with a transponder 30, or other wireless electronic device. For instance, the transponder 30 may have a transmitter that can send information to the interrogation reader 40 without having to use the signal 46 as the means for communication. The transponder 30 may contain a battery to power the transmitter, or an energy storage unit that is charged by the energy when the device is in the field 48 of the signal 46. It is understood to one of ordinary skill in the art there are many other manners in which to communicate with a wireless identification device such as a transponder 30, and. that the present invention is not limited to the particular manner described above.

FIGS. 4A–4D show various configurations of slot antenna arrangements to provide an antenna 38 by using the slot 20 in the container 10 as previously described. Voltage signals are provided by the transponder 30 to opposites sides of the slot 20. In the preferred embodiment for a beer keg container 10, one side of the slot 20 is formed by the outer wall 12 and the other side of the slot 20 is formed by the rim edge 52. When the voltage signals are applied across the slot 20, the slot 20 radiates electro-magnetic waves similar to the manner in which a pole antenna arrangement would radiate to effectuate communications.

Figure 4A:
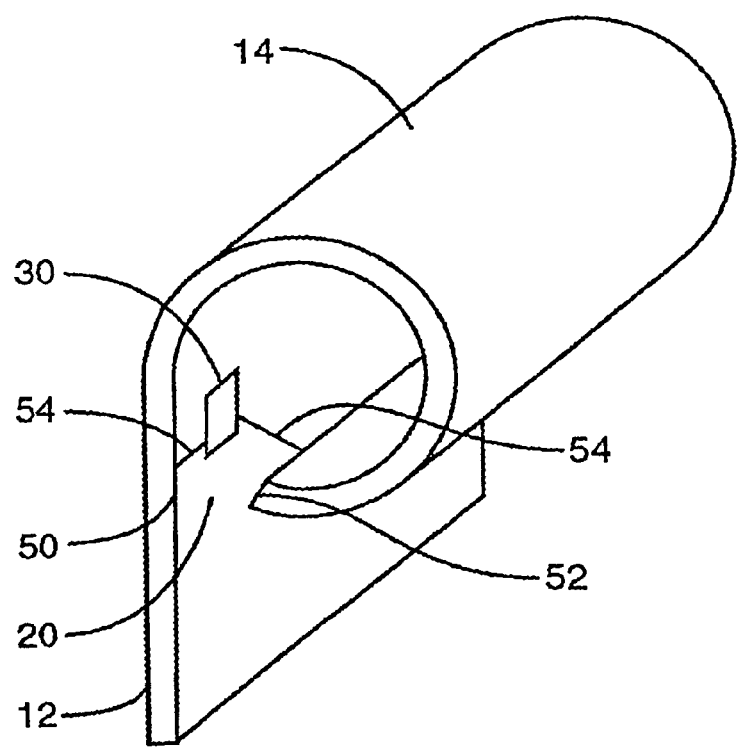
FIG. 4A is a schematic view of the slot antenna using direct feed lines.

FIG. 4A illustrates a close-up of the outer wall 12 and the rim 14 illustrating how the transponder 30 uses the slot 20 as an antenna 38 using feed lines 54. The transponder 30 is located in the inner portion of the rim 14. The slot 20 is formed by the gap between the outer wall edge 50 and the rim edge 52 extends around the entire circumference of the container 10. Feed lines 54 are connected to the outer wall edge 50 and the rim edge 52 to provide an electrical connection between the transponder 30, and particularly the wireless communication electronics 32, and the slot 20.

Figure 4B:
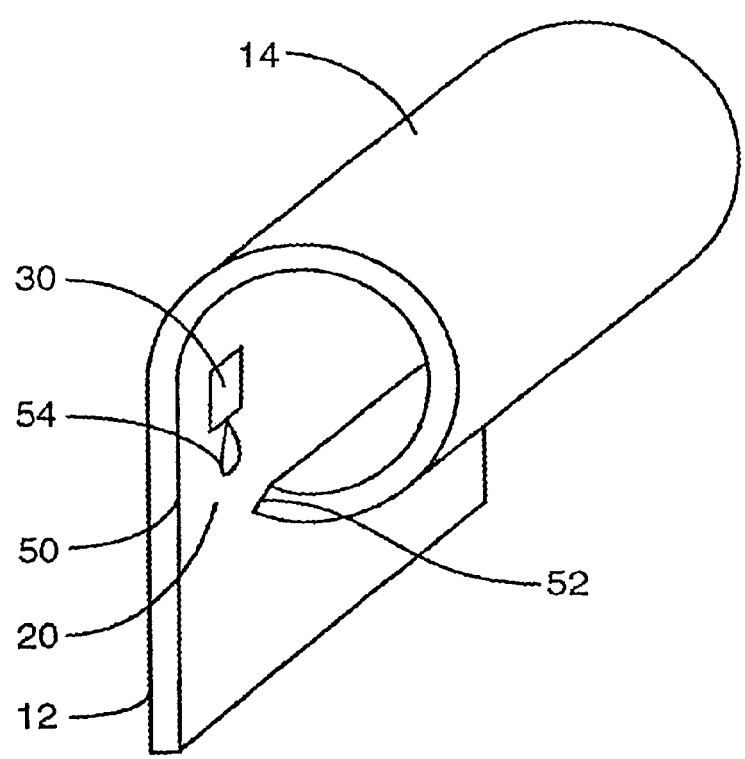
FIG. 4B is a schematic view of the slot antenna using reactive feed lines.

FIG. 4B contains an embodiment whereby the feed line 54 from the transponder 30 does not directly connect to the outer wall edge 50 or the rim edge 52. Instead, the feed line 54 is placed in close proximity to the outer wall edge 50 or the rim edge 52 to reactively couple to the slot 20. The feed line 54 is still excited without direct contact between the feed line 54 and the slot 20 due to its close proximity to the slot 20.

Figure 4C:
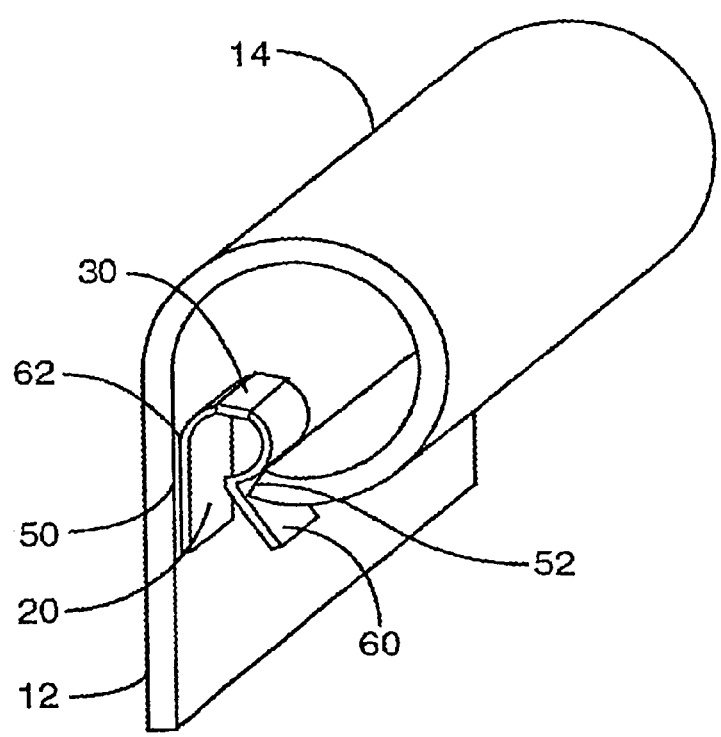
FIG. 4C is a schematic view of the slot antenna using a transponder mounting device as feed lines.

In FIG. 4C, an embodiment is shown whereby a mounting device, called a conductive clip 60 in the preferred embodiment, provides a mounting technique for the transponder 30 and also provides a connection between the transponder's 30 wireless communication electronics 32 and the slot 20 to provide antenna 38 functionality. The conductive clip 60 is substantially in the shape of an "R" in the preferred embodiment, however other types of clips with the same characteristics as described herein may also be used. The conductive clip 60 has mounted to it the transponder 30 at the top of the conductive clip 60. The conductive clip 60 is inserted with the round portion. inside the slot 20 to provide a secure fit between the outer wall 12 and the rim edge 52. The portion of the conductive clip 60 contacting the outer wall 12 provides a ground plane 62 for the slot antenna 38. The portion of the conductive clip 60 contacting the rim edge 52 provides a connection or feed line 54 to the slot 20 to provide antenna 38 functionality for the transponder 30.

Figure 4D:
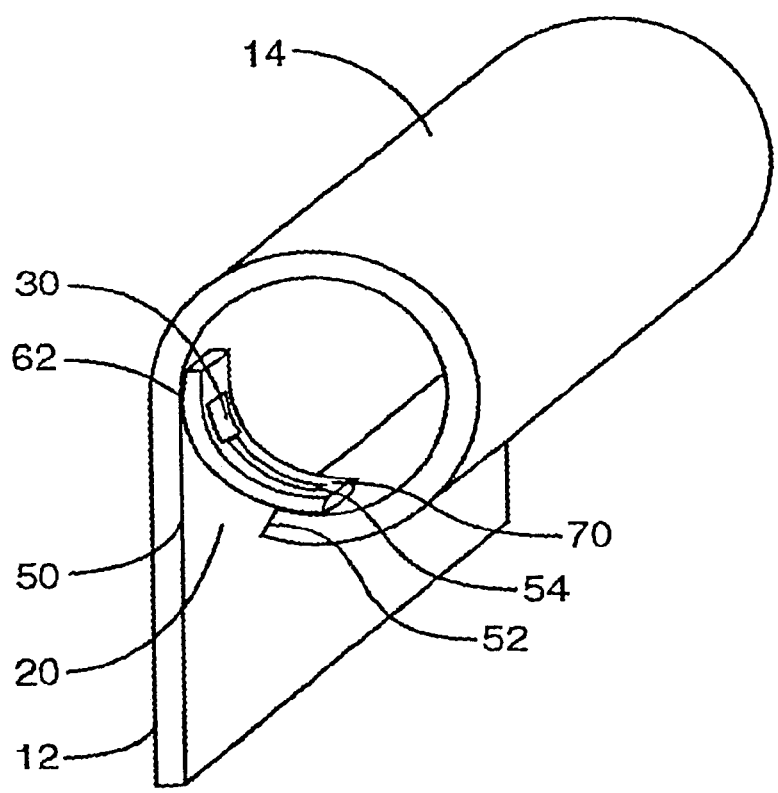
FIG. 4D is a schematic view of the slot antenna using feed lines on a no-conductive substrate to couple to the slot.

FIG. 4D shows another alternative arrangement whereby the transponder 30 is mounted to a substrate material 70. The substrate material 70 is curled and placed inside the rim 14 whereby one side of the substrate material 70 contacts the outer wall 12 and the other side of the substrate material 70 contacts the rim edge 52. The transponder 30 has a feed line 54 that extends from the wireless communication electronics 32 and rests on the substrate material 70, extending downward proximate to the rim edge 52. The transponder 30 located proximate to the outer wall 12 provides coupling to the outer wall creating a ground plane 62 with earth. The feed line 54 extends to the rim edge 52 and is coupled with the rim edge 52 either as an open circuit or a short circuit to provide the optimum coupling of the transponder wireless communication electronics 32 to the slot 20 to create the slot antenna 38 depending on the length of the feed line 54.

Figure 5:
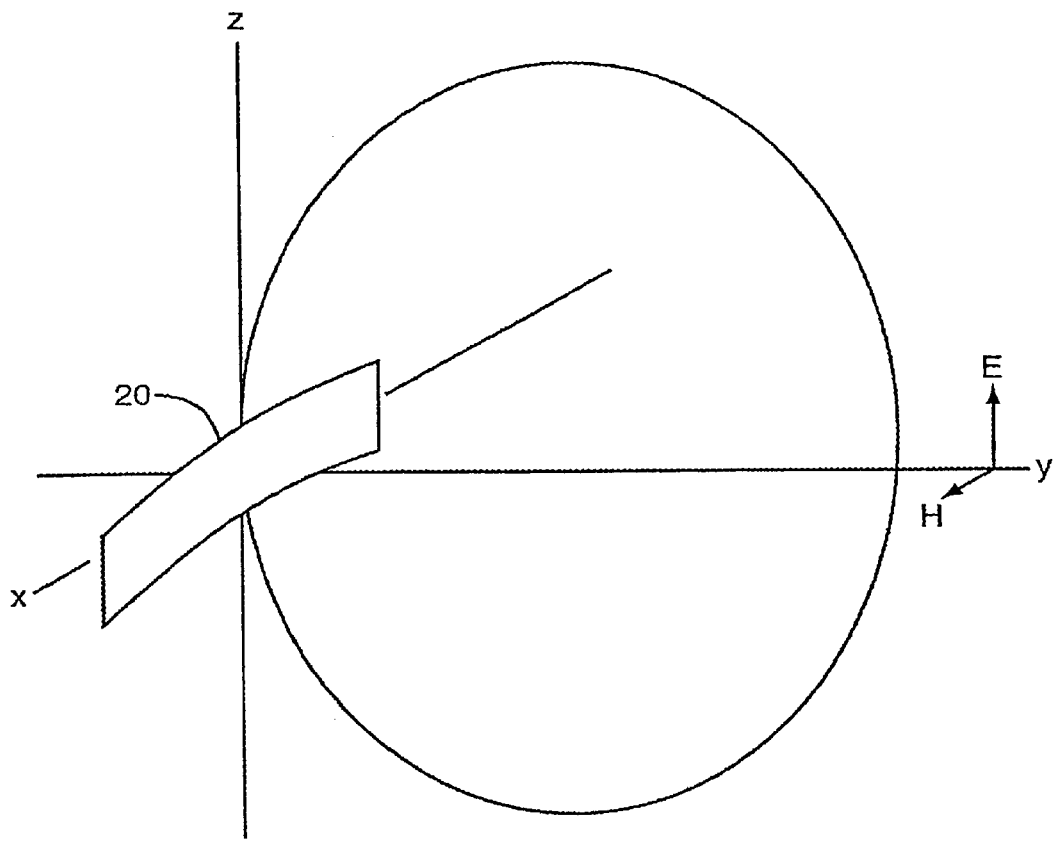
FIG. 5 is a schematic diagram illustrating the radiation pattern of the slot antenna arrangement.

FIG. 5 illustrates the radiation pattern of a slot antenna 38 that has the same basic radiation pattern as a pole antenna arrangement such as a dipole antenna, but the E and H fields are interchanged. However, the radiation pattern of the slot antenna 38 is a modified version of this radiation pattern due to both the curved nature of the slot 20 and the reflection from the surface of the container 10. Therefore while it is noted that the radiation of the slot antenna 39 may have the characteristics of that illustrated in FIG. 5, such is provided for background purposes only and the present invention is not limited to a slot antenna 38 with such radiation pattern.

When using a slot antenna 38, it is desired for the impedance of the slot 20 to match the impedance of the transponder 30 at the desired frequency to maximize energy transfer from the transponder 30 to the slot antenna 38 for a maximum emitted radiation pattern. If the transponder 30 has a characteristic impedance that is not the conjugate of the slot 20 to maximize energy transfer, a matching network can be provided to do so. An antenna itself can be considered a matching network of sorts transforming its terminal impedance to 377 ohms, the impedance of free space. However, the impedance of the transponder 30 may not be the same as the slot 20. In this instance, the slot antenna 38 may not perform optimally since the maximum energy transfer would not occur between the transponder 30 and the slot antenna 38.

Figure 6:
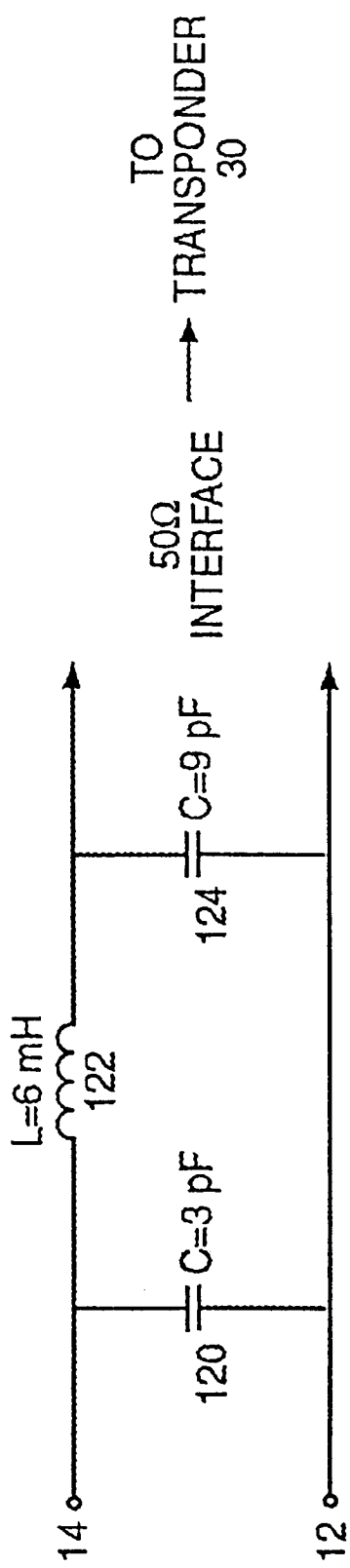
FIG. 6 is a schematic diagram of an impedance matching circuit between the slot antenna and the transponder.

In the preferred embodiment, the slot antenna 38 has a fairly low impedance. Therefore it is necessary to transform this impedance into the impedance of transponder 30 to maximum energy transfer and therefore maximize the strength of radiation pattern emitted by the slot antenna 38. An impedance matching network illustrated in FIG. 6 is provided to match the impedance of the slot 20 to the impedance of the transponder 30 ensure that the slot antenna 38 radiates an efficient radiation pattern for the operating frequency of the transponder 30 with minimal or no reflection. The matching network circuit converts the impedance of the slot 20 to the impedance of the transponder 30 for an operating frequency of 868 MHz. The transponder 30 has an impedance of 50 ohms. The matching network circuit is connected on the rim 14 and the outer wall 12 across the slot 20 in parallel with a capacitor 120 of approximately 3 pico Farads. Then connected in series to the node, connecting the circuit to the rim 14 and the capacitor 120, is an inductor 122 of approximately 5 nano Henries. Another capacitor 124 of approximately 9 pico Farads is connected in series with the inductor 122 and in parallel with the node connecting the circuit to the outer wall 12 and the capacitor 120. It should be noted that the characteristics of containers 10 and slot 20 impedances for desired frequencies may require different matching networks than described for the preferred embodiment and that the present invention is not limited hereto.

Figure 7A:
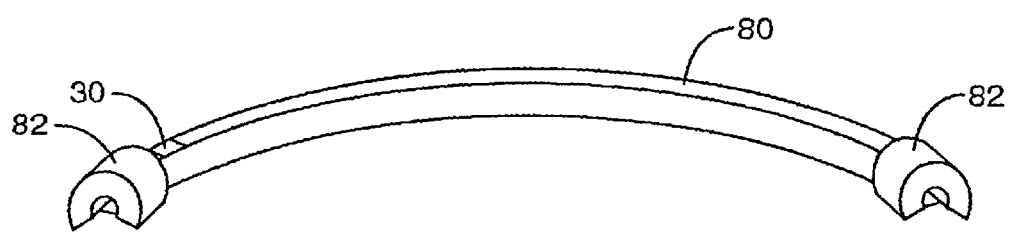
FIG. 7A is a schematic diagram of the slot antenna using shorting posts with one shorting post proximate to create a monopole antenna equivalent.
Figure 8A:
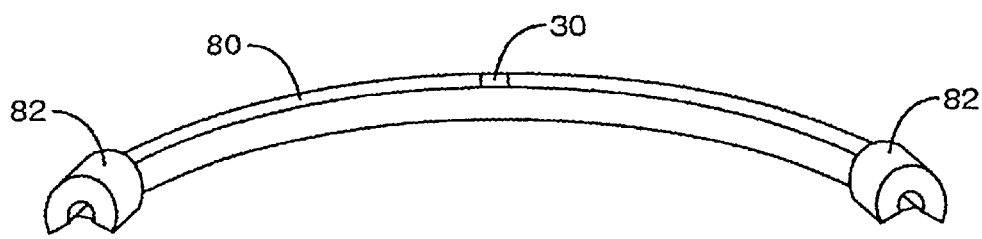
FIG. 8A is a schematic diagram of the slot antenna using shorting posts with the transponder in between the shorting posts to create a dipole antenna equivalent.

In the preferred embodiment, the container 10 has a continuous slot 20 that extends in a circular path. It may be desired to provide a technique or manner in which to define the length of the slot 20 so that the slot antenna 38 radiates in an improved manner at the operating frequency of the transponder 30. One method of defining the slot 20 length is to provide shorting posts 82 as illustrated in FIGS. 7A and 8A to further improve performance of the slot antenna 38 depending on the frequency. The length of antenna or the slot 20 for a slot antenna 38 is related to the radiation pattern of electronic signals radiated at the desired frequencies. For instance, the length of a dipole antenna is λ divided by 2 where λ is equal to the speed of light divided by the desired operating frequency. The length of the slot 20 is defined by the boundaries, at which there is no longer a gap of space or the placement of conductive material. Some slot antennas 38 are designed in containers 10 or other materials in which the slot 20 is placed at a predefined and desired length. The slot 20 length is defined by providing a conductive material in the slot 20 that shorts one side of the slot 20 to the other side. In the preferred embodiment, this is the outer wall 12 and the rim edge 52. Shorting the slot 20 gives a finite length to the slot antenna 38. Shorting posts 82 are placed in the slot 20 at desired locations on each side of the location of transponder 30 coupled to the slot 20 to define the length of the slot 20. An impedance matching network may or may not be necessary with shorting posts 82 depending if the impedance of the slot 20 and the impedance of the transponder 30 are matched sufficiently in order for the slot antenna 38 to emit a desired radiation pattern.

Figure 7B:
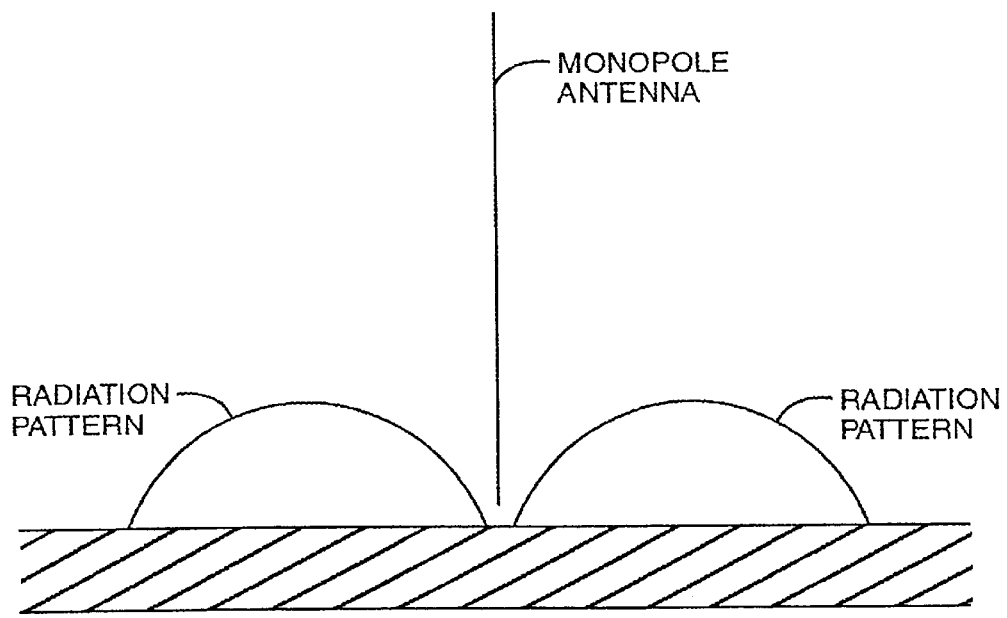
FIG. 7B is a schematic diagram of a typical monopole antenna radiation pattern.

FIG. 7 illustrates an arrangement where one shorting post 82 is located near to or proximate to the transponder 30 and the other shorting post 82 is located a distance away from the transponder 30. The transponder 30 is mounted to a carrier material 80 that is placed inside the rim 14 for mounting the transponder 30 and shorting posts 82. The carrier material 80 is used as a convenient manner in which to mount the transponder 30 and the shorting posts 82 in the rim 14 of the container 10. The carrier material 80 is made out of a non-conductive material so that it does not conduct with the slot 20, i.e. the outer wall 12 or the rim edge 52. The transponder 30 is coupled to the slot 20 to provide slot antenna 38 by techniques of coupling the transponder's 30 wireless communication electronics 32 as previously described above. Coupling the transponder 30 to the slot 20 at or proximate to one of the shorting posts 82 creates a slot antenna 38 similar to a radiation pattern of monopole antenna like that shown in FIG. 7B, but it should be noted that the exact radiation pattern of the slot antenna 38 may be different depending on the frequency of the transponder 30 and the shape and other characteristics of the container 10.

Figure 8B:
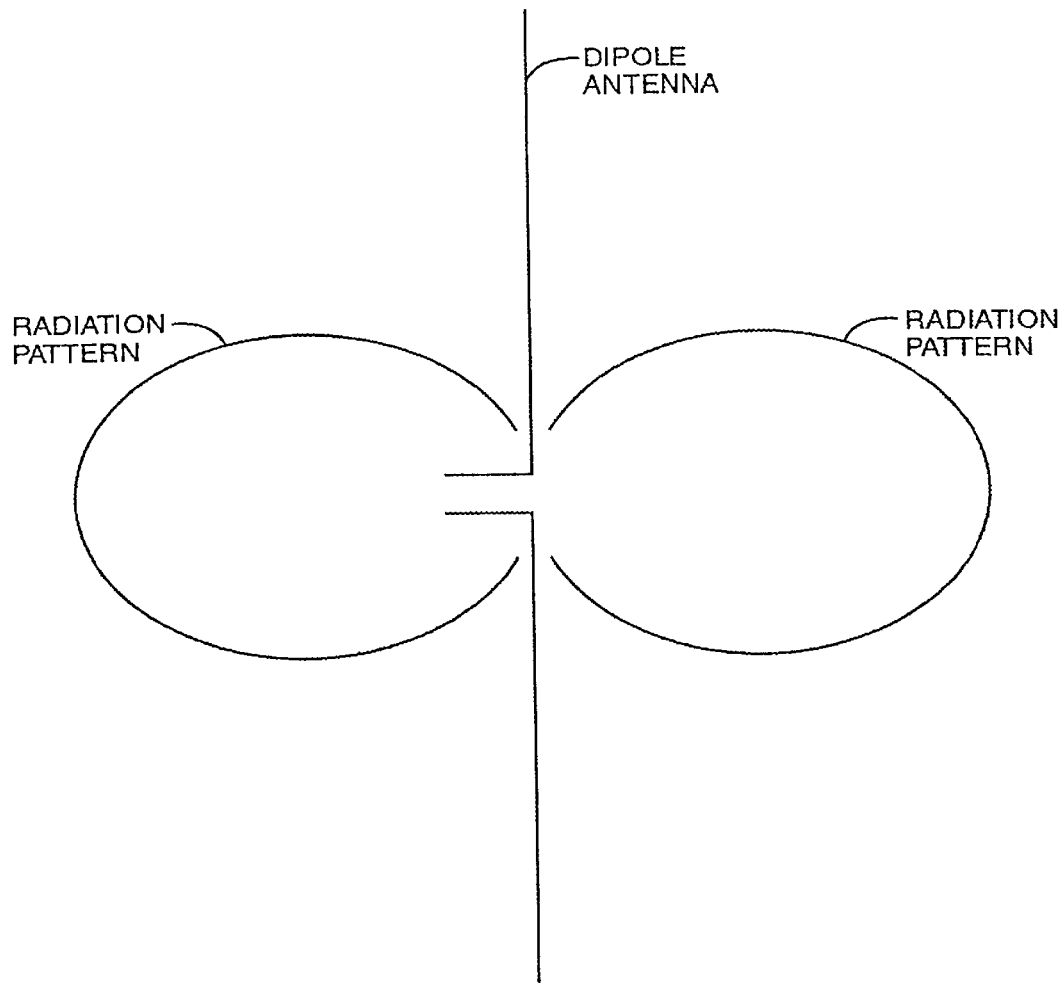
FIG. 8B is a schematic diagram of a typical dipole antenna radiation pattern.

Alternatively as illustrated In FIG. 8A, the transponder 30 and shorting posts 82 are mounted on the carrier material 80 to mount inside the rim 14 of the container 10 similar to FIG. 7A. However, the transponder 30 is coupled to the slot 20 between the two shorting posts 82. Coupling the transponder 30 to the slot 20 in the middle or center of the shorting posts 82 creates a slot antenna 38 similar to a dipole like shown in FIG. 8B, but it should be noted that the exact radiation pattern of the slot antenna 38 may be different depending on the frequency of the transponder 30 and the shape and other characteristics of the container 10.

Figure 9:
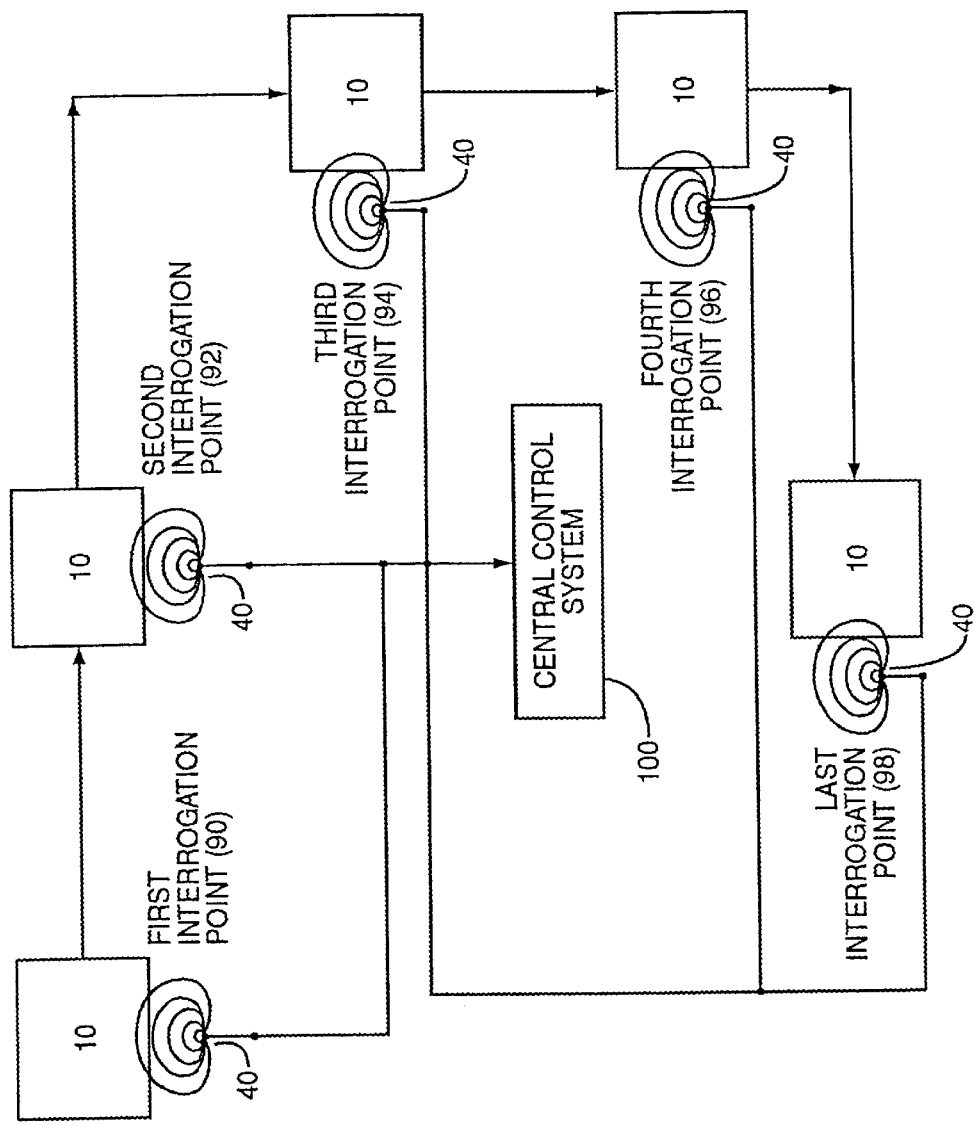
FIG. 9 is a schematic diagram illustrating the tracking and information system to track containers having a transponder.

FIG. 9 illustrates a tracking system in which containers 10 containing transponders 30 can be tracked through an environment such as a factory or distribution facility. For example, the transponder 30 connected to container 10 could pass a first interrogation point 90 that includes an interrogation reader 40. When the container 10 and its transponder 30 is in the presence of the interrogation reader 40 as described previously, a message containing information and/or a specific request for information may be transmitted by the interrogation reader 40 and received by the transponder 30. This process continues as the container 10 moves to a second interrogation point 92, a third interrogation point 94, a fourth interrogation point 96, and on to a last interrogation point 98.

A central control system 100 maintains the information from the interrogation readers 40 and monitors the movement of the containers 10 through the facility. The information received by each of the interrogation readers 40 may be forwarded to the central control system 100 either through direct wire or LAN connection. The central control system 100 could also send information to the interrogation reader 40 to be transmitted to the transponder 30 for identification purposes. The central control system 100 tracks the expected location of the containers 10 and may be alerted if it expects to receive information about a particular container and does not.

During commissioning of each container 10, it may be necessary to place the container 10 containing the transponder 30 in range of an interrogation reader 40 in order to erase previously stored information in memory, 36 or to store particular data or configuration information about the container 10 in memory 36 for later use.

In the foregoing description, like-reference characters designate like or corresponding parts throughout the several views. Also, it is to be understood that such terms as "forward", "right", and "upward", and the like are words of convenience that are not to be construed as limiting terms. Certain modifications and improvements will occur to those skilled in the art upon a reading of the foregoing description. It should be understood that the present invention is not limited to any particular type of container or slot arrangement. One of ordinary skill in the art will recognize that there are different manners in which containers with slots can be used to provide antenna functionality for a wireless communication device in accordance with the present invention. It should be understood that all such modifications and improvements have been deleted herein for the sake of conciseness and readability but are properly within the scope of the following claims.

What is claimed is:

1. A device for identifying a container having a slot, comprising:
    a wireless communication device mounted on the container to remotely communicate information associated with the container; and
    a slot antenna formed by electronically associating said wireless communication device to the slot.

2. The device of claim 1, further including an impedance matching network associated with said wireless communication device and connected to said slot to match the impedance of said slot antenna to the impedance of said wireless communication device.

3. The device of claim 1, wherein said slot antenna is formed by connecting a feed line from said wireless communication device to a first slot edge.

4. The device of claim 3, wherein said feed line is directly connected to said first edge of the slot.

5. The device of claim 3, wherein said feed line is reactively coupled to said first edge of the slot.

6. The device of claim 3, wherein said wireless communication device is associated with a second edge of the slot to function as a ground plane for said slot antenna.

7. The device of claim 6, wherein said wireless communication device is mounted on a conductive mounting device placed in the slot, wherein a first end of said conductive mounting device is in contact with said wireless communication device and said first edge of the slot to form said feed line and a second end of said conductive mounting device is in contact with said wireless communication device to form said ground plane.

8. The device of claim 6, wherein said wireless communication device is mounted on a substrate placed in the slot and connecting between said first edge and said second edge of the slot, wherein said feed line is connected to said substrate to reactively couple with said first edge of the slot, and said wireless communication device is reactively coupled to said second edge of the slot to form said ground plane.

9. The device of claim 6, wherein said wireless communication device has a second feed line connecting to said wireless communication device to said second edge to form said ground plane.

10. The device of claim 6, wherein said first edge of the slot is associated with the outer wall and said second edge of the slot is associated with the rim.

11. The device of claim 1, further comprising a first and second shorting post placed in the slot wherein the distance between said first and second shorting posts defines the length of said slot antenna.

12. The device of claim 11, wherein said first shorting post is positioned on one side of said wireless communication device and said second shorting post is positioned on the other side of said wireless communication device.

13. The device of claim 11, wherein said first shorting post is positioned proximate to said wireless communication device and said second shorting post is positioned a distance away from said wireless communication device.

14. The device of claim 11, wherein said wireless communication device is mounted to a carrier material to secure said wireless communication device in the slot wherein said first and second shorting posts are positioned at each end of said carrier material.

15. A system for identifying a container, comprising:
a container having a slot;
a wireless communication device mounted on the container to remotely communicate information associated with the container;
a slot antenna formed by electronically associating said wireless communication device to said slot.

16. The system of claim 15, wherein said slot is formed between an outer wall of said container and a rim formed by a curl on an end of said outer wall.

17. The system of claim 15, further including an impedance matching network associated with said wireless communication device and connected to said slot to match the impedance of said slot to the impedance of said wireless communication device.

18. The system of claim 15, wherein said slot antenna is formed by connecting a feed line from said wireless communication device to a first slot edge.

19. The system of claim 18, wherein said feed line is directly connected to said first slot edge.

20. The system of claim 18, wherein said feed line is reactively coupled to said first slot edge.

21. The system of claim 18, wherein said first slot edge is associated with said outer wall.

22. The system of claim 18, wherein said first slot edge is associated with said rim.

23. The system of claim 18, wherein said wireless communication device is associated with a second edge of said slot to function as a ground plane for said slot antenna.

24. The system of claim 23, wherein said wireless communication device is mounted on a conductive mounting device placed in said slot, wherein a first end of said conductive mounting device is in contact with said wireless communication device and said first edge of said slot to form said feed line and a second end of said conductive mounting device is in contact with said wireless communication device to form said ground plane.

25. The system of claim 23, wherein said wireless communication device is mounted on a substrate placed in said slot and connecting between said first edge and said second edge of said slot, wherein said feed line is connected to said substrate to reactively couple with said first edge of said slot, and said wireless communication device is reactively coupled to said second edge of said slot to form said ground plane.

26. The system of claim 23, wherein said wireless communication device has a second feed line to connect to said wireless communication device to said second edge to form said ground plane.

27. The system of claim 23, wherein said first slot edge is associated with said rim and said second edge of said slot is associated with said outer wall.

28. The system of claim 23, wherein said first edge of said slot is associated with said outer wall and said second slot edge is associated with said rim.

29. The system of claim 18, further comprising a first and second shorting post placed in said slot wherein the distance between said first and second shorting posts defines the length of said slot antenna.

30. The system of claim 29, wherein said first shorting post is positioned on one side of said wireless communication device and said second shorting post is positioned on the other side of said wireless communication device.

31. The system of claim 29, wherein said first shorting post is positioned proximate to said wireless communication device and said second shorting post is positioned a distance away from said wireless communication device.

32. The system of claim 29, wherein said wireless communication device is mounted to a carrier material to secure said wireless communication device in said slot wherein said first and second shorting posts are positioned at each end of said carrier material.

33. The system of claim 15, wherein said container is a beer keg.

34. A method of monitoring a container, comprising the steps of:
associating a wireless communication device with the container;
moving the container through at least one interrogation point containing an interrogation reader; and
communicating monitoring information associated with the container between said wireless communication device and said interrogation reader through a slot antenna formed by a slot within the container.

35. The method of claim 34, further comprising the step of matching the operating frequency of said slot antenna to said wireless communication device.

36. The method of claim 34, further comprising the step of exciting said slot through use of a feed line connected to said wireless communication device and electronically connected to an edge of said slot.

37. The method of claim 36, further comprising the step of grounding the wireless communication device to an edge of said slot to form a ground plane for said slot antenna.

38. The method of claim 37, further comprising the step of mounting said wireless communication device on a conductive mounting device contained in said slot wherein a first end of said conductive mounting device is in contact with said wireless communication device and an edge of said slot to form said feed line and a second end of said conductive mounting device is in contact with said wireless communication device to form said ground plane.

39. The method of claim 37, further comprising the step of mounting said wireless communication device on a substrate contained in the slot and connecting between said first edge and said second edge of the slot, wherein said feed line is connected to said substrate to reactively couple to said edge of the slot, and said wireless communication device is reactively coupled to a second edge of the slot to form said ground plane.

40. The method of claim 36, wherein said step of exciting said slot further includes connecting a second feed line to said wireless communication device and to a second edge of said slot to form a ground plane for said slot antenna.

41. The method of claim 34, further comprising the step of placing a first and second shorting post in said slot to define the length of said slot antenna.

42. The method of claim 41, wherein said step of placing a first and second shorting post further includes placing said first shorting post on one side of said wireless communication device and placing said second shorting post on the other side of said wireless communication device.

43. The method of claim 41, wherein said step of placing a first and second shorting post further includes placing said first shorting post proximate to said wireless communication device and placing said second shorting post a distance away from said wireless communication device.

44. The method of claim 41, wherein said step of placing a first and second shorting post further includes placing said wireless communication device and said first and second shorting posts on a carrier material in said slot.

* * * * *